United States Patent [19]

Karsh

[11] 4,369,476
[45] Jan. 18, 1983

[54] MULTI-TRACK RECORDING HEAD ASSEMBLY WITH ELECTROMAGNETIC CROSS-TALK NEUTRALIZATION

[75] Inventor: Herbert Karsh, Laguna Beach, Calif.

[73] Assignee: The Perkin-Elmer Corporation, Norwalk, Conn.

[21] Appl. No.: 172,044

[22] Filed: Jul. 25, 1980

[51] Int. Cl.³ ............................................. G11B 5/115
[52] U.S. Cl. ..................................... 360/123; 360/124
[58] Field of Search ........ 360/123, 121, 122, 124–126, 360/128–129

[56] References Cited

U.S. PATENT DOCUMENTS

| 3,585,314 | 6/1971 | Korn | 360/124 X |
| 4,245,268 | 1/1981 | Toshimitsu | 360/123 X |
| 4,291,352 | 9/1981 | Gooch | 360/124 X |

FOREIGN PATENT DOCUMENTS 240098  7/1960  Australia ............................ 360/124

Primary Examiner—John H. Wolff
Attorney, Agent, or Firm—S. A. Giarratana; E. T. Grimes; T. P. Murphy

[57] ABSTRACT

A high track density recording head assembly which eliminates cross-talk in high track density recording systems by positioning very thin neutralization heads between each pair of adjacent recording heads. The neutralization heads are provided with air gaps aligned with the gaps in the adjacent heads and have coils wound to develop a polarity opposite to that in the adjacent recording head. The neutralization head flux thus produced cancels the recording head lateral fringing flux that is responsible for recording interference in the adjacent recording tracks.

6 Claims, 8 Drawing Figures

MULTI-TRACK RECORDING HEAD ASSEMBLY WITH ELECTROMAGNETIC CROSS-TALK NEUTRALIZATION

This invention relates generally to electromagnetic recording transducers and particularly to a recording transducer assembly having a novel shielding that reduces interference between adjacent recording tracks.

In general, magnetic recording transducer comprises a ferromagnetic core that provides a complete loop or path of magnetic flux generated by electric current flowing through a magnetizing coil wrapped radially around the core. A narrow air gap through the core forces the generated flux to jump the short gap, and in so doing, the lines of flux spread or fringe out beyond the core poles created by the air gap. When moving magnetic recording media, such as magnetic tapes or recording discs are placed adjacent the air gap, the fringing flux polarizes magnetic dipoles in the media according to the direction of flux flowing through the core and if an alternating current is passed through the magnetizing coil a corresponding alternating magnetic flux through the core will correspondingly polarize alternating dipoles in the media.

Unfortunately, magnetic flux crossing the air gaps also is laterally fringed at the gap so that the magnetic flux lines may encroach into closely adjacent neighboring recording tracks. This lateral fringing becomes critical in multi-track recording where the head assembly may include a number of individual recording transducers or heads, each operating in a narrow track on the recording media that is closely spaced to its adjacent track. Thus, one magnetic head may actually record in adjacent tracks so that when the adjacent tracks are subsequently read, a serious cross-talk may result.

A partial solution to this problem of cross-talk is to provide static shields of highly magnetic materials between adjacent recording heads. These static shields effectively isolate the coils of the adjacent heads to block all flux linkages that may result therefrom and also tend to block the fringing flux that spreads from the air gap above the level of the magnetic media. The static shields have two major drawbacks, however: They cannot prevent lateral fringing that takes place within the volume of the recording media, that is, cross-talk resulting from flux spreading within a narrow track on the media; and the required thickness of the static shields (generally 0.003 inches or more) limit the minimum head separation between adjacent recording heads in the head assembly. While such head spacing may seem to present minimal problems and need not be considered for all present and prior art head assemblies, it becomes most critical with the new generation of recording heads formed by thin film deposition and having a total width in the order of 0.001 inches, including the magnetizing coil, and spaced from adjacent recording tracks having a center-to-center spacing in the order of 0.0015 inches.

To simplify the assembly of recording heads and to thus reduce production costs, most cores are made in two halves and thereby have a back gap in addition to the desired recording gap. Generally the back gap is diametrically opposite the recording gap and is provided with a comparatively large cross-section to reduce path reluctance in the core. The existence of this back-gap generates another form of interference, known as "crossfeed", between adjacent heads.

Crossfeed results from coupling between a read head and a write head independently of the presence of a magnetic recording media and becomes very important during simultaneous reading and writing by adjacent heads. The crossfeed effect results partly from inductive coupling between the adjacent heads and partly from the coupling caused by radiation from the two separate halves of the write head dipoles. This radiating crossfeed is also materially reduced by the present invention.

It is therefore the principal objective of this invention to eliminate cross-talk and crossfeed interferences in high track density recording systems.

Briefly described, the invention comprises at least one pair of first and second adjacent recording heads separated by first and second contiguous neutralization heads, the first neutralization head located between the first recording head and the second neutralization head; and the second neutralization head lying between the first neutralization head and the second recording head. The magnetizing current coil of the first neutralization head is wound in a direction opposite to that coil on the first recording head, and the two coils are coupled together in series. Likewise, the current coil on the second neutralization head is wound in a direction opposite to that on the second recording head, and the two coils are coupled together in series. The air gaps in the cores of all neutralization and recording heads are aligned so that all heads may simultaneously record on a moving magnetic media.

Since the first recording head and the first neutralization head are oppositely wound, the same magnetizing current flowing through their coils will produce opposite magnetic fields which have the effect of cancelling or neutralizing the fringe flux which normally would extend out laterally from the sides of the air gaps.

A major advantage of the invention is that the neutralization heads can repel the lateral fringing flux from the recording heads both above and within the volume of the actual recording medium so that very high track densities may be employed. For example, by use of thin film techniques, each recording head in a multi-track recording head assembly may have a width of 0.001 inches and may be separated from its adjacent head by two neutralization heads each having a thickness of from 0.0001 to 0.0003 inches.

These and other objects and advantages of the present invention will become apparent from a reading of the following description taken together with the accompanying drawings.

BRIEF DESCRIPTION OF THE DRAWINGS

In the drawings which illustrate a preferred embodiment of the invention.

DETAILED DESCRIPTION OF THE PREFERRED EMBODIMENT

Figure 1:
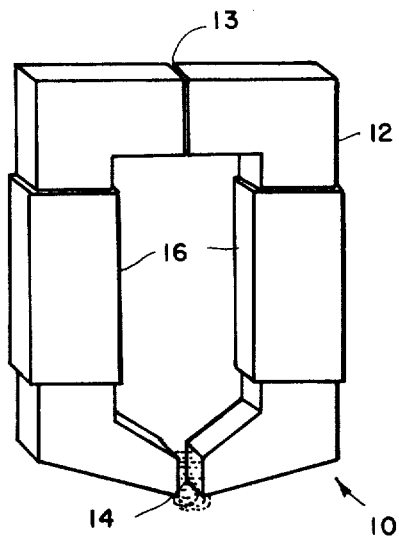
FIG. 1 is a perspective elevation view of an electromagnetic recording head typical of those found in the prior art.

Illustrated in FIG. 1 is an enlarged elevation view of a typical prior art head 10 comprising a ferromagnetic core 12 having a back gap 13, a very narrow read/write air gap 14 and series coils 16. If an alternating current flows through the coils 16, a corresponding alternating flux is produced within the core. At the air gap 14 of the core 12 the flux lines tend to spread beyond the dimensions of the core due to flux fringing. It is this fringing flux that extends outward beyond the bottom surface of the core 12 that is used to magnetically transfer information to a moving magnetic recording media that underlies the air gap 14.

The fringing flux at the air gap 14 also extends outward from the sides of the gap 14 and thus affects the magnetization properties of the magnetic recording media that is outside of the normal recording track under the core 12. This flux fringing does not present a significant problem in single head recording or with relatively widely spaced heads in a multi-head assembly but becomes critical in multi-track recording systems in which the individual heads are closely spaced in an attempt to increase track density.

Figure 2:
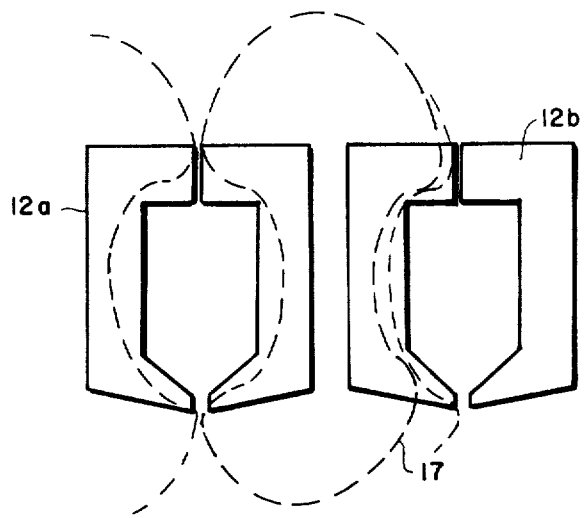
FIG. 2 is an elevation view of a pair of adjacent prior art heads and illustrates crossfeed interference.

FIG. 2 illustrates an adjacent pair of prior art cores 12a and 12b and the flux interlinkage that generates crossfeed interference. The dipole flux generated in the core 12a by its coil (not shown) couples to the core 12b and the resultant recording flux in the core 12b that is transferred into the recording media under the core 12b becomes a composite of the desired recording flux 17 induced into core 12b by its own coil plus couple flux radiated from the adjacent core 12a.

Figure 3:
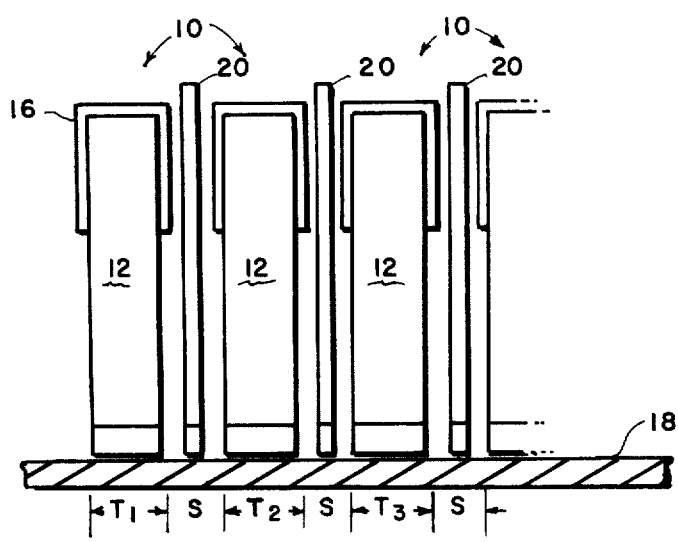
FIG. 3 is a front elevation view of a multi-head recording assembly typical of those found in the prior art and illustrates a plurality of adjacent heads each being separated by a static shield.

Illustrated in FIG. 3 is a prior art multi-track recording assembly including a plurality of cores, such as the core 12 of FIG. 1, having thereon a coil 16 illustrated, for clarity, at the top of the cores 12. In an attempt to obtain high track density in the recording media 18 the cores 12 are closely spaced over their respective tracks $T_1$, $T_2$, etc., each separated by a spacing, s. Because of the lateral fringing described above, some flux lines will spread from their respective tracks, T, into the blank spaces, s. If the recording cores 12 are placed close together (i.e., the distance, s, becoming very small), the laterally fringing flux will partially record on the adjacent recording track to thereby produce cross-talk.

A partial solution to the problem of crossfeed and cross-talk interference is to insert a magnetic static shield 20 between adjacent recording heads 10. These shields 20 will not only block flux linkage between adjacent coils 16 and aid in reducing radiating crossfeed coupling, but also will tend to block much of the laterally fringed flux spreading from the sides of the air gap in each core 12 and which is above the top surface of the magnetic media 18. The shields 20 will not, however, block flux fringing that takes place within the volume of the magnetic media 18. Flux actually recorded within the track $T_1$ may therefore spread through the magnetic media and through the very small spacing as to interfere and cause cross-talk into the adjacent recording track $T_2$. Furthermore, to be effective, the shields 20 should have a width of at least 0.003 inches; this thickness therefore limits the maximum track density available to this prior art type of recording.

Figure 4:
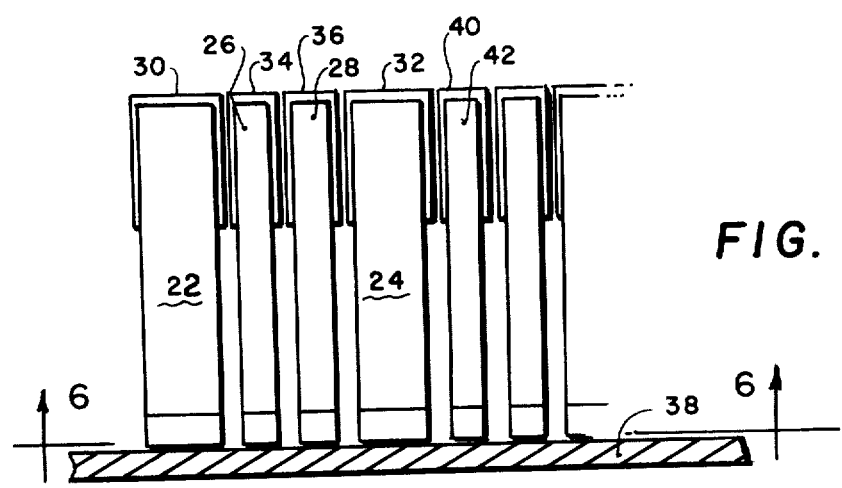
FIG. 4 is a greatly enlarged frontal elevation view of a multi-track recording head assembly with electromagnetic cross-talk neutralization in accordance with the present invention.

Referring now to FIG. 4, the recording head assembly of the present invention is illustrated with a plurality of recording heads, including a first recording head 22 and a second recording head 24, as well as a number of neutralization heads, including a first neutralization head 26 and a second neutralization head 28. The neutralization heads 26, 28 are positioned between the recording heads 22, 24 with neutralization head 26 being proximate the recording head 22 and neutralization head 28 being proximate the recording head 24. Head 22 is provided with a first coil 30; head 24 is provided with a second coil 32; head 26 is provided with a third coil 34; and head 28 is provided with a fourth coil 36. The air gaps of the heads are in alignment so that they can all simultaneously record on a moving magnetic media 38.

Figure 5:
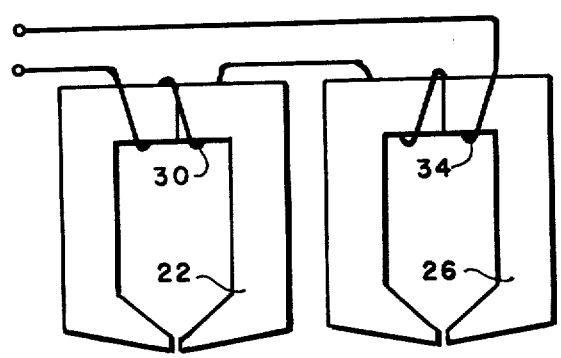
FIG. 5 is a simplified pictorial view illustrating the winding of a recording head and adjacent neutralization head in the assembly of FIG. 4.

The simplified pictorial elevation view of FIG. 5 illustrates how the coils of adjacent recording-head/-neutralization-head pairs are coupled together. It will be noted that coil 34 on the first neutralization head 26 is wound around its core in opposition to that on the coil 30 of the first recording head 22. Since the two coils are connected in series, a current flowing through the windings of the coils will produce, in the neutralization head 26, a magnetic flux opposite in polarity to that in the recording head 22. Referring again to FIG. 4, the coil of recording head 24 is likewise coupled to neutralization head 28, and is also coupled to the opposingly wound coil 40 of yet a third neutralization head 42. This pattern is repeated across the entire recording head assembly.

Figure 6:
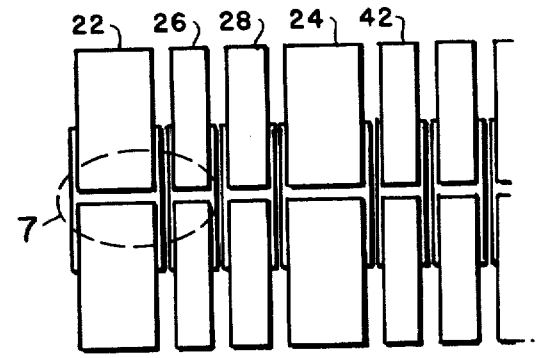
FIG. 6 is a bottom plan view taken along the lines 5—5 of FIG. 4.
Figure 7:
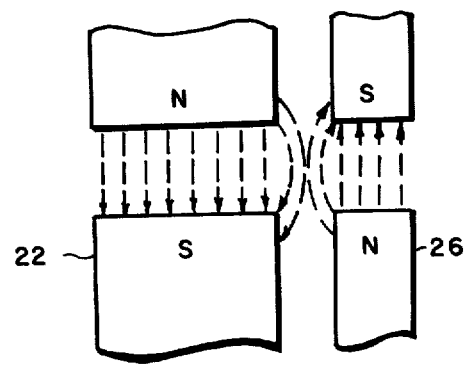
FIG. 7 is an enlarged view of the portion of FIG. 6 encircled by broken line 6.

The theory of operation of this invention will be discussed with reference to the bottom plan view of FIG. 6 and the enlarged simplified view of FIG. 7. With specific reference to recording head 22 and neutralization head 26, it can be seen that the flux lines at their respective gaps are oppositely polarized with respect to one another. In FIG. 7, the magnetic polarization at the gap of the recording head 22 shows lines of flux from the north to the south pole faces. Since at any instant of time the lines of flux developed at the air gap of recording head 22 are opposed by the lines of flux developed at the air of neutralization head 26, the combined magnetic field must have points of neutralization where the two individual fields are of equal intensity but opposite polarity. The neutralization head 26 is carefully designed so that its fringing flux effectively neutralizes the unwanted lateral fringing flux of the recording head 22, but does not neutralize that portion of the recording head's fringing flux that records within the proper recording track. This may be accomplished by varying the number of turns on the neutralization head compared to the recording head 22.

The neutralization head 26 need not create a magnetic field as strong as that of the recording head 22 to effectively neutralize the lateral fringing flux. It has been found that the width of a neutralization head need only be 1/10 to ¼ the width of a recording head to neutralize both cross-talk interference resulting from flux spread within the recording media, and crossfeed interference resulting from dipole radiation coupling of adjacent recording heads.

Figure 8:
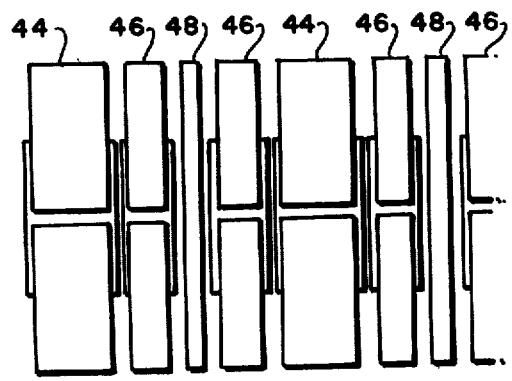
FIG. 8 is a bottom plan view of an alternate embodiment of the present invention which includes both electromagnetic cross-talk neutralization and static shielding.

FIG. 8 illustrates an alternate embodiment having a plurality of recording heads 44, and a plurality of pairs of neutralization heads 46, each pair being separated by a static shield 48. The static shield 48 includes a lamina of highly magnetizable material to block magnetic field effects. The static shield might further include one or more laminas of a highly conductive material to block electrostatic field effects.

The use of a static sheild 48 adds thickness to the assembly and thus reduces the track density. However, the static shield might be included in some recording head assemblies when it is important to maximize isolation between adjacent recording heads to minimize cross-talk and inductive linkage effects.

Having thus described my invention, what I claim is:

1. A multi-track recording head assembly with electromagnetic cross-talk and crossfeed neutralization comprising:
    a first recording head and a second recording head for developing varying magnetic fluxes for recording a first track and a second track, respectively, on a recording medium moving relative said heads;
    a first neutralization head juxtaposed between said first recording head and said second recording head and proximate to said first recording head for developing a varying magnetic flux having a polarity opposite to that developed by said first recording head for neutralizing a portion of said flux by said first recording head which would otherwise be recorded as crossfeed and cross-talk on said second track; and
    a second neutralization head juxtaposed between said first neutralization head and said second recording head for developing a varying magnetic flux of opposite polarity of said flux developed by said second recording head for neutralizing a portion of said flux developed by said second recording head which would otherwise be recorded as crossfeed and cross-talk on said first track.

2. A multi-track recording head assembly as claimed in claim 1 wherein:
    said first recording head includes a first magnetic core provided with a first air gap, and a first coil wound around said first magnetic core, whereby a fringing magnetic flux is developed at said first air gap when a current flows through said first coil; and
    said second recording head includes a second magnetic core provided with a second air gap, and a second coil wound around said second magnetic core, whereby a fringing magnetic flux is developed at said second air gap when a current flows through said second coil.

3. A multi-track recording head assembly as claimed in claim 2 wherein:
    said first neutralization head includes a third magnetic core provided with a third air gap, and a third coil wound around said third magnetic core in a direction opposite to the winding of said first coil around said first core, whereby a fringing magnetic flux is developed at said third air gap which neutralizes a portion of said fringing magnetic flux developed by said first air gap, when current flows through said third coil; and
    said second neutralization head includes a fourth magnetic core provided with a fourth air gap, and a fourth coil wound around said fourth magnetic core in a direction opposite to the winding of said second coil around said second core, whereby a fringing magnetic flux is developed at said fourth air gap which neutralizes a portion of said fringing magnetic flux developed by said second air gap, when current flows through said fourth coil.

4. A multi-track recording head assembly as claimed in claim 3, wherein the current flowing through said first coil is in phase with the current in said third coil and wherein the current flowing through said second exciting coil is in phase with the said current in said fourth coil.

5. A multi-track recording head assembly as claimed in claim 4 wherein said first coil and said third coil are connected in series and wherein said second coil and said fourth coil are connected in series.

6. A multi-track recording head assembly as claimed in claim 1 further comprising a static shield disposed between said first neutralization head and said second neutralization head.

* * * * *